(12) United States Patent  
Lanzinger

(10) Patent No.: US 7,124,565 B2  
(45) Date of Patent: Oct. 24, 2006

(54) REEL FOR A CROP HARVESTING DEVICE

(75) Inventor: Bernhard Lanzinger, Langenpreising (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/149,764

(22) Filed: Jun. 10, 2005

(65) Prior Publication Data

US 2005/0274100 A1 Dec. 15, 2005

(30) Foreign Application Priority Data

Jun. 12, 2004 (DE) .................. 10 2004 028 550

(51) Int. Cl.
*A01D 57/02* (2006.01)
(52) U.S. Cl. ....................................... 56/220
(58) Field of Classification Search ............... 56/220, 56/219, 221, 222, 223, 224, 225, 226, 227, 56/350, 351, 354, 384, 364–367, 375–380
See application file for complete search history.

(56) References Cited

U.S. PATENT DOCUMENTS

| | | | |
|---|---|---|---|
| 758,241 A * | 4/1904 | Friend et al. ................ 56/227 |
| 2,212,878 A * | 8/1940 | Hume et al. ................ 56/226 |
| 2,431,397 A * | 11/1947 | Harrison ..................... 56/226 |
| 2,644,289 A * | 7/1953 | Hume ......................... 56/226 |
| 2,795,921 A * | 6/1957 | Hume ......................... 56/226 |
| 3,145,520 A | 8/1964 | Hume et al. ................ 56/220 |
| 3,902,305 A | 9/1975 | Gibson et al. ............... 56/220 |
| 6,397,573 B1 * | 6/2002 | Majkrzak ..................... 56/220 |
| 6,978,589 B1 * | 12/2005 | Lanzinger ................... 56/220 |
| 2001/0009093 A1 | 7/2001 | Majkrzak ..................... 56/220 |

FOREIGN PATENT DOCUMENTS

DE    10 2004 001 383 B3    1/2004

* cited by examiner

*Primary Examiner*—Árpád Fábián Kovács

(57) ABSTRACT

A reel for a crop harvesting device includes tine carriers extending across the width of the reel carrying tines for conveying crop, and links for supporting the tine carriers. The links are mounted by link carriers to the tine carriers. The tine carriers are composed of short tube elements, each extending between the links and connected to each other by mounting elements. The mounting elements make up cylindrical support surfaces for the link carrier and secure the link carrier against axial movement along the tine carrier. The links are the only connection between adjacent tine carriers.

7 Claims, 3 Drawing Sheets

REEL FOR A CROP HARVESTING DEVICE

FIELD OF THE INVENTION

This invention pertains to a reel for a crop harvesting device and specifically to links and mounting elements used to assemble a reel without a center tube.

BACKGROUND OF THE INVENTION

Reels are used in crop harvesting devices, particularly on cutting mechanisms, in order to deliver the standing crop to a cutter bar and a cross conveyor. They include a plurality of tine carriers (usually five or six) that extend across the width of the crop harvesting device.

U.S. Pat. No. 3,145,520 describes a reel that includes tine carrier tubes with tines mounted thereon. The tine carrier tubes are supported on spiders that are arranged on the respective tube ends and distributed over the width of the reel. The tine carrier tubes are rotatably supported on the spiders and turned by eccentric drive mechanisms in order to achieve the desired orientation of the tines. A central tube for providing the reel with the required stability extends across the central axis of the reel. This structure is a disadvantage because the central tube increases the weight of the reel and limits the operator's view of the cutting mechanism elements, particularly the cutter bar and regions located in front of the cutter bar.

U.S. Pat. No. 3,902,305 describes a mowing device with a flexible cutting belt for cutting standing crop. A reel located above the cutting belt delivers the crop to the cutting belt and consists of spiders at each end and tine carrier tubes extending between. A central tube can be eliminated in this device because the working width of the mowing device is relatively small. However, the lack of support between the ends of the tine carrier tubes makes this reel unsuitable for larger working widths.

In reels that are equipped with a central support tube and in which the tine carriers are supported between their ends by links connected to the support tube, such as U.S. Pat. No. 3,145,520 above, it is not required to make special provisions for fixing the links on the tine carriers in the axial direction, because the links are fixed on the support tube. If a reel according to U.S. Pat. No. 3,145,520 were not provided with a center support tube, axial guidance of the links would not be provided.

U.S. Pat. No. 6,397,573 describes a reel assembly in which the tine carriers are divided into tubular segments in the axial direction. The segments are fixed to one another by solid connecting shafts that are inserted into the ends of the segments and fixed therein with bolts or screws. The connecting shafts include a section of reduced diameter that serves to accommodate a support. This support is mounted on the outer ends of the arms, namely on the spiders of the reel that are connected to the central support tube. This reel assembly also contains a central support tube that has the disadvantage of high weight and a restricted field of vision.

A reel without a central support tube is described in republished DE 10 2004 001 383 A. In this reel, the tine carriers are connected to one another by links that form a supporting framework. The links form a hexagon, in the corners of which the tine carriers are rotatably supported.

In republished DE 10 2004 022 196 A, the links on the tine carrier are supported by carriers that are composed of bearing halves. The bearing halves are fixed to one another by the link that is pushed onto a link-carrying section located on the ends of the bearing halves. The bearing halves are axially fixed by annular holding elements that are respectively mounted on the tine carrier together with an adjacent tine.

SUMMARY OF THE INVENTION

A reel in the form of a framework is constructed of tine carriers and links that simply connect respectively adjacent tine carriers to one another, but are not connected to a central support tube. Since this framework provides sufficient support, support elements extending over the length of the reel can be eliminated between the tine carriers. This reel then has relatively low weight and does not restrict the operator's view of the crop harvesting device.

Since the central support tube is eliminated, it is necessary to fix the link carriers axially to the tine carriers. In the invention, mounting elements are provided and have two functions: (1) they fix the short segments of the tine carriers to one another, and (2) they form a radial and axial support for the link carrier.

According to one embodiment, each link extends between a link carrier and an adjacent link. The end of the other link faces the link carrier. Alternatively, the respective links extend between two link carriers that accommodate one or two links.

The axial guidance of the link carrier in the longitudinal direction of the tine carrier is provided by surfaces that extend radially relative to the longitudinal axis of the mounting element. This longitudinal axis extends coaxially to the axis of the tine carrier segments. These surfaces are provided by a corresponding depression in the mounting element. Preferably rings are arranged on the mounting element. In this embodiment, a cylindrical mounting element can be inexpensively manufactured. Alternatively, the mounting element can be provided with a cylindrical outside surface and utilize the tine carriers for axially securing the link carrier.

DETAILED DESCRIPTION OF THE DRAWINGS

Figure 1:
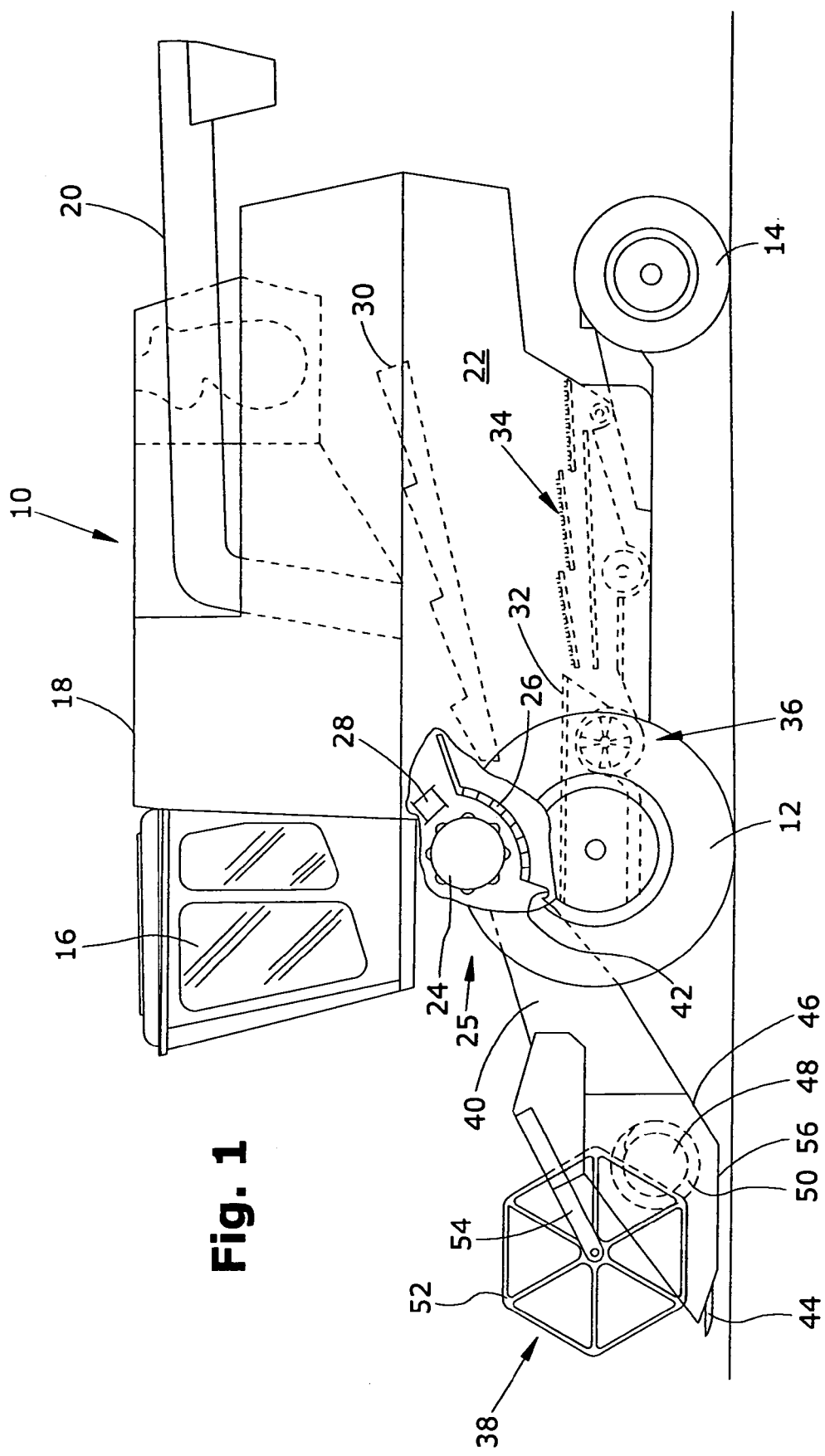
FIG. 1 shows a combine-harvester with a crop harvesting attachment that includes a reel according to the present invention.

The combine-harvester 10 shown in FIG. 1 is supported on driven front wheels and steerable rear wheels 12 and 14, respectively. An operator's cab 16 is provides from which the combine-harvester can be operated by a driver. A grain tank 18, located to the rear of the driver's cab 16, can discharge the harvested grain introduced therein to another container via a unloading auger 20. The grain tank 18 is supported on a frame 22. The harvested crop is separated into its large and small fractions as it is conveyed through a threshing drum 24, a threshing basket 26 and a turning drum 28. The harvested crop is additionally separated on downstream straw shaker 30, as well as on a preparation tray 32 and screens 34. The threshed grain is ultimately transported into the grain tank 18, while the large crop fractions are dropped onto the ground by the straw shaker 30. The lightweight fractions are blown off the screens 34 and onto the ground by a blower 36. The crop lying or standing on the ground is picked up by the crop harvesting device 38 and delivered to the threshing drum 24 via a feed channel 40 having an inclined conveyor and a rock catcher 42.

In the embodiment shown, the crop harvesting device 38 includes a cutting mechanism having a reciprocating cutter bar 44 on the front edge. The frame 46 of the crop harvesting device 38 also carries a screw conveyor 48 with flights 50 that rotate about a central tube. A reel 52 for delivering the standing crop to the cutter bar 44 and the screw conveyor 48 is located above and in front of the screw conveyor 48. The reel 52 is connected to the frame 46 at both ends by reel support arms 54 and is driven about its longitudinal axis by a mechanical or hydraulic drive. The reel turns in the counterclockwise direction as shown in FIG. 1.

Figure 2:
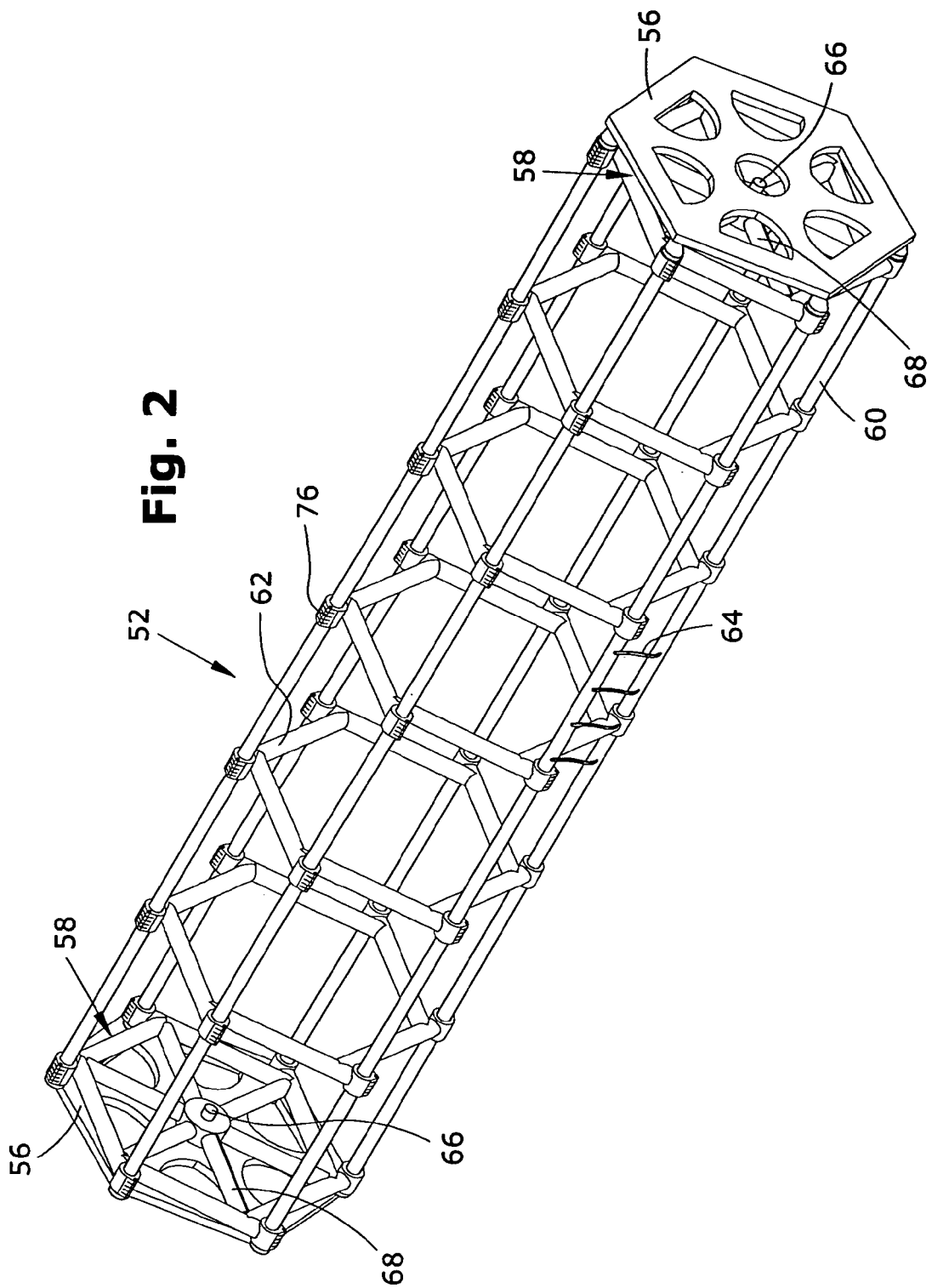
FIG. 2 is a perspective view of a reel according to the present invention.

FIG. 2 shows a perspective representation of the reel 52. The reel 52 includes two spiders 58 on the lateral ends and six parallel tine carriers 60. The tine carriers are cylindrical tubes with constant external cross sections over their lengths. The reel also includes hexagonally arranged links 62 supporting the tine carriers 60 in a hexagonal array. Tines 64 are mounted on the tine carriers 60. The spiders 58 are arranged on each end of the reel 52. Each spider includes six arms 68 that extend radially outward from a hub 66. The tine carriers 60 extend across the entire width of the reel 52 between the outer ends of the arms 68 of the spiders 58. The tine carriers are composed of short individual tube elements that extend over a portion of the length and are mechanically connected to one another. The tine carriers 60 are rotatably supported on the arms 68 and can also be turned relative to the links 62.

A plate cam 56 is arranged adjacent to the spider 58 on the right side of the reel 52. The axis of rotation of this plate cam is eccentric to the axis of the hubs 66 of the spiders 58. The tine carriers 60 are connected to the plate cam by control levers that function as pivoting drives. When the crop harvesting device is operating, the hubs 66 and consequently the arms 68 of the spiders 58 are rotated by a motor. The tine carriers 60 rotate relative to the arms 68 so that the tines 64 are oriented approximately downward during a complete revolution of the reel 52 as shown in FIG. 2. Thus, harvested crop is delivered to the cutter bar 44 and the screw conveyor 48 by the reel 52.

The interior of the reel 52 does not contain any supporting elements that extend over the length of the reel between the tine carriers 60. Thus, the hubs 66 of the spiders 58 are not connected by a center support tube that extends across the width of the reel 52. No supporting elements extend over a corresponding width, such as for example, thin links. The resulting open space reduces the weight of the reel 52 in comparison to embodiments provided with a center support tube. The view of the crop harvesting device 38 is not blocked by a center support tube. Thus, the operator the cab 16 has an unobstructed view of the cutter bar 44 and the region located in front of the crop harvesting device 38.

The reel 52 is equipped with links 62 to provide support for the reel that may have a width of 6 m or more (e.g., 9 m). The links 62 form hexagonal rings. The links 62 and the spiders 58 are the only elements that support the tine carriers 60. The links 62 and the tine carriers 60 form a framework. The connection between the links 62 and the tine carriers 60 allow the tine carriers 60 to rotate about their longitudinal axis while all other direction of movement are restricted. Links 62 are positioned at suitable distances across the width of the reel 52.

Figure 3:
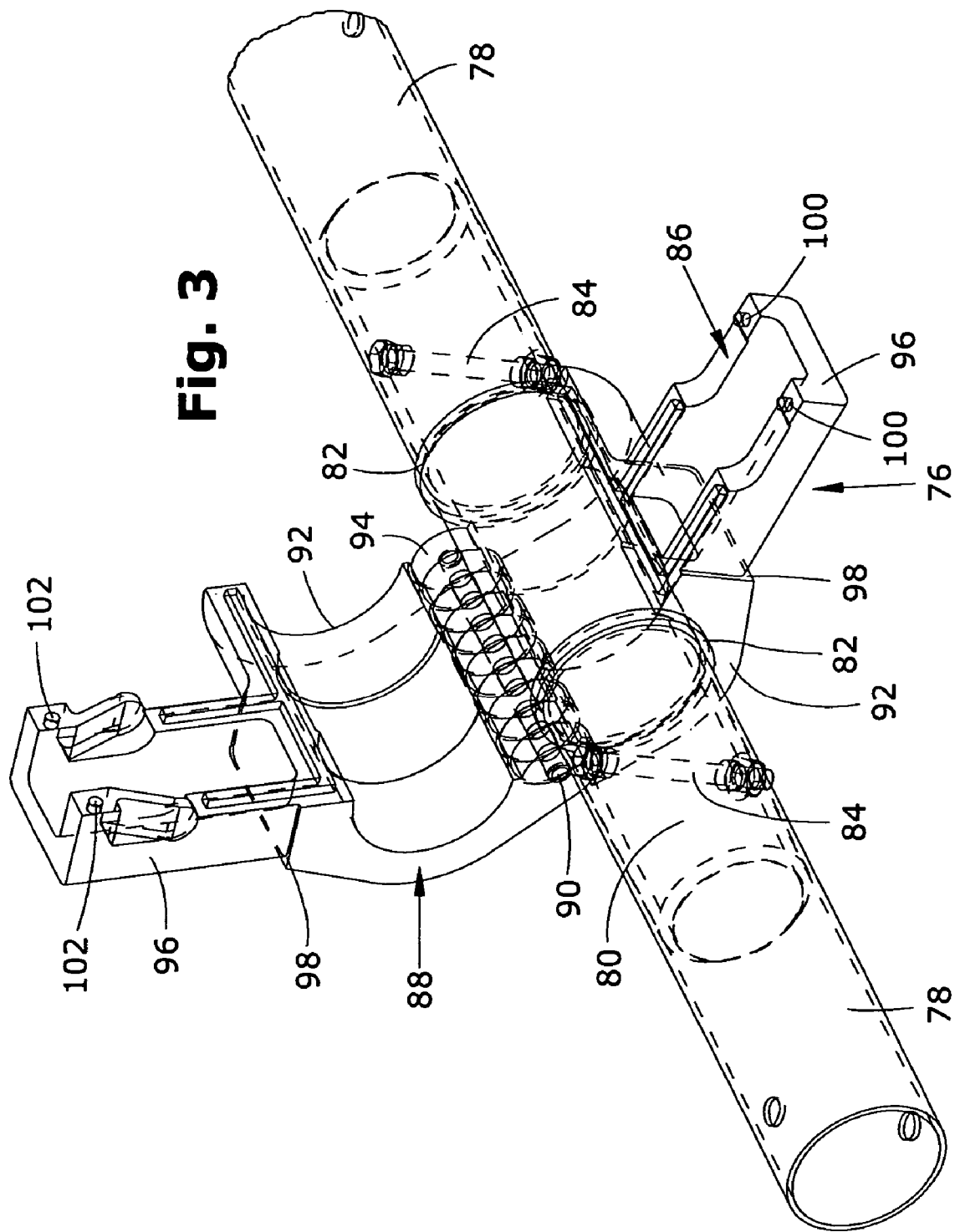
FIG. 3 is a perspective view of two tine carrier sections with a connecting element that fixes the tine carrier sections to one another, and with a bearing half for attaching a link ring that is arranged on the connecting element.

FIGS. 2 and 3 show that the first end of each link 62 is connected to a tine carrier 60 by a link carrier 76. On the opposite or second end, the link is rigidly connected (preferably by a weld) to the next adjacent link 62, in the immediate vicinity of the first end of that next link 62. The next link 62 is in turn supported on the tine carrier 60 at its first end, by a link carrier 76. The link carriers 76 enable the tine carriers 60 to rotate as described above.

In FIG. 3, the tine carriers 60 include short tube segments 78 that respectively extend between the spiders 58 and the hexagon rings formed by the links 62. The segments 78 include short cylindrical tubes and are fixed to one another by mounting elements 80. The mounting elements 80 are also constructed as cylindrical tubes and have an outside diameter that corresponds to the inside diameter of the tube segments 78 of the tine carriers 60. Two rings 82 are positioned and fixed on the respective mounting elements 80.

In the assembled state, the regions of the mounting elements 80 that lie outside the rings 82 extend into the interior of the segments 78 so that the tube segments 80 adut the outside surfaces of the rings 82. The mounting elements 80 and the segments 78 are fixed to one another by bolts or screws 84 that respectively extend through radial bores in the segments 78 and the mounting elements 80.

The mounting elements 80 form cylindrical support surfaces for the link carrier 76 arranged between the rings 82. The rings 82 fix the link carrier 76 in the longitudinal direction of the tine carriers 60.

A link carrier 76 is illustrated in FIG. 3. Each link carrier 76 includes a first bearing half 86 and a second bearing half 88 that hold one end of the link 62 in the assembled state. The two bearing halves 86, 88 are fixed to one another by a hinge pin 90.

Each bearing half 86, 88 includes a support section 92 with an inner semicircular support surface and opposite parallel ends. Five hinge projections 94 radially extend from the semicircular support surface on one side of the support section 92. Bores arranged in the hinge projections 94 extend coaxially to one another and are parallel to the longitudinal axis of the support surface. The hinge pin 90 extends through these bores. A link carrier section 96 extending radially to the semicircular support surface lies on the opposite side of the support section 92. The link carrier section 96 contains a rectangular flange 98. The respective bearing halves 86, 88 preferably consist of a hard, shockproof material that also ensures an extended support service life without lubrication. A polyamide, such as Zytel ST 801, proved successful in practical applications.

The offset of the hinge projections 94 and the arrangement of the bores for the hinge pin 90 are designed so that the support surfaces lie opposite one another and face one another when the two respective bearing halves 86, 88 are assembled. The two bearing halves 86, 88 are pressed against one another and the hinge pin 90 is inserted into the bore so that the bearing halves 86, 88 are pivotally connected to one another by the hinge, formed by the hinge projections 94 and the hinge pin 90. The assembled support surfaces define an approximately cylindrical opening for the mounting element 80. Other coupling elements other than the hinge pin 90 are known for pivotably coupling the two bearing halves 86, 88 to one another. For example, it is possible to cast the two bearing halves 86, 88 in the form of a single component with an integral hinge.

The hinged connection between the two bearing halves 86, 88 can be opened, positioned on the mounting element 80 and then closed. Pins 100 on the link carrier section 96 of one bearing half 86 then penetrates into complementary openings 102 in the link carrier section 96 of the other bearing half 88 in order to secure the link carrier sections 96 to one another.

Once the hinged connection between the bearing halves 86, 88 is closed, the link carrier sections 96 form a cylindrical base. The base is then enclosed by the first end of the hollow link 62 that also has a rectangular cross section. The first end of the links 62 abuts the flange 98. The bearing halves 86, 88 are fixed to one another so that the link 62 encloses the link carrier sections 96. The adjacent tine carriers 60 are connected to one another by the link 62 and prevent the link 62 from sliding off the link carrier sections 96. At least one additional mechanism for mounting the link carrier sections 96 to the link 62 is provided. For example, a pin (not shown) can be provided that extends through suitable bores in the link 62 and in the link carrier sections 96. Alternatively, a flexible element in one or both link carrier sections 96 is pre-stressed toward the outside and is arranged on the side wall of an opening in the link 62 in the assembled state.

The inside and outside cross sections of the link 62 are rectangular or square. The link carrier sections 96 also have a rectangular cross section. Undesirable torsions and rotational movements between the link carrier 76 and the link 62 can be prevented with this structure.

FIGS. 2 and 3 show that the length of the link carrier 76 in the axial direction of the tine carrier 60 is significantly greater than that of the link 62 measured in the same direction. This results in a relatively long lever arm for supporting the tine carrier 60 by the links 62 and limits distortions of the tine carrier 60 or the entire reel 52. This relatively long axial dimension of the link carrier 76 reduces the mounting arrangement for a tine 64. In order to reduce crop conveying problems, the link carrier sections 96 of the link carriers 76 are not arranged centrally on the link carriers 76 (relative to the axial direction of the tine carriers 60), but rather positioned adjacent to one axial end of the link carrier 76. An arrangement in which only every second tine 64 is located adjacent to the link carrier 76 is eliminated by choosing the alternating orientation of the link carriers 76 shown, in which successive link carrier sections 76 are alternately positioned on the left and the right side of the link carrier 76 relative to the rotating direction of the reel 52 (see FIG. 2).

The invention claimed is:

1. A reel for a crop harvesting device comprising:
   tine carriers that extend parallel across the width of the reel and carry tines for conveying the crop;
   links for supporting the tine carriers;
   link carriers that mount the links on the tine carriers, wherein the tine carriers are short tube segments that extend between the links;
   mounting elements which fix the links to one another, wherein the mounting elements form cylindrical support surfaces for the link carrier between adjacent segments and secure the link carrier against an axial displacement along the tine carrier, wherein the links only connect adjacent tine carriers to one another.

2. The reel according to claim 1, wherein the first end of each link is connected to one mounting element by one link carrier, and the second end of each link is connected to another link.

3. The reel according to claim 2, wherein the second end of the link is respectively mounted in the immediate vicinity of the first end of the another link.

4. The reel according to claim 1, wherein the mounting element contains surfaces that extend radially outward to both sides of the cylindrical support surfaces for the link carrier at that mounting element.

5. The reel according to claim 4, wherein the surfaces that extend radially outward are formed by rings arranged on the mounting element.

6. The reel according to claim 1, wherein the length of the link carrier in the axial direction of the tine carriers is greater than the length of the link measured in the same direction.

7. The reel according to claim 1, wherein the link carrier contains a link carrier section that is arranged adjacent to an axial end of the link carrier, and the link carrier sections of successive link carriers are positioned on alternate sides of the link carriers relative to the direction of rotation of the reel in order to arrange tines on the regions of the tine carriers that are not occupied by the link carrier.

* * * * *